Nov. 29, 1938.

C. W. HANSELL 2,138,160

AUTOMATIC ELECTRICAL SYSTEM

Filed April 14, 1934

INVENTOR
C. W. HANSELL

BY H. G. Grover
ATTORNEY

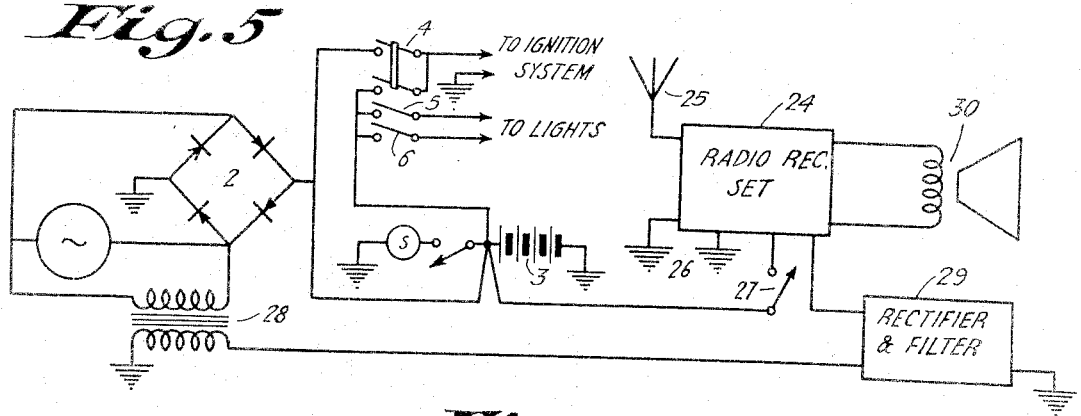
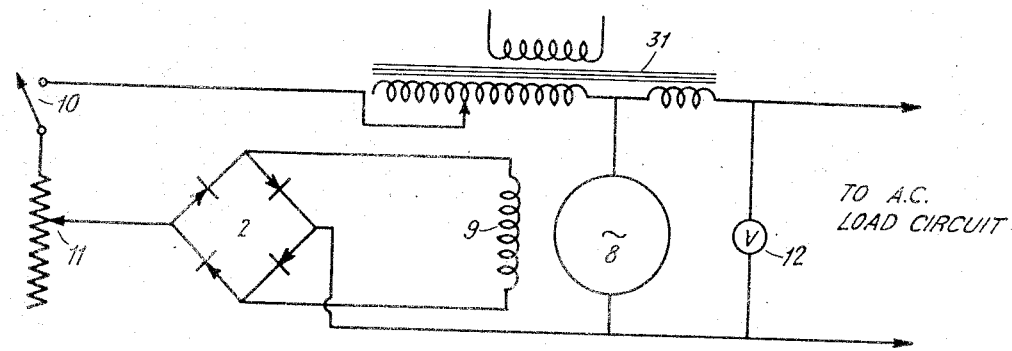
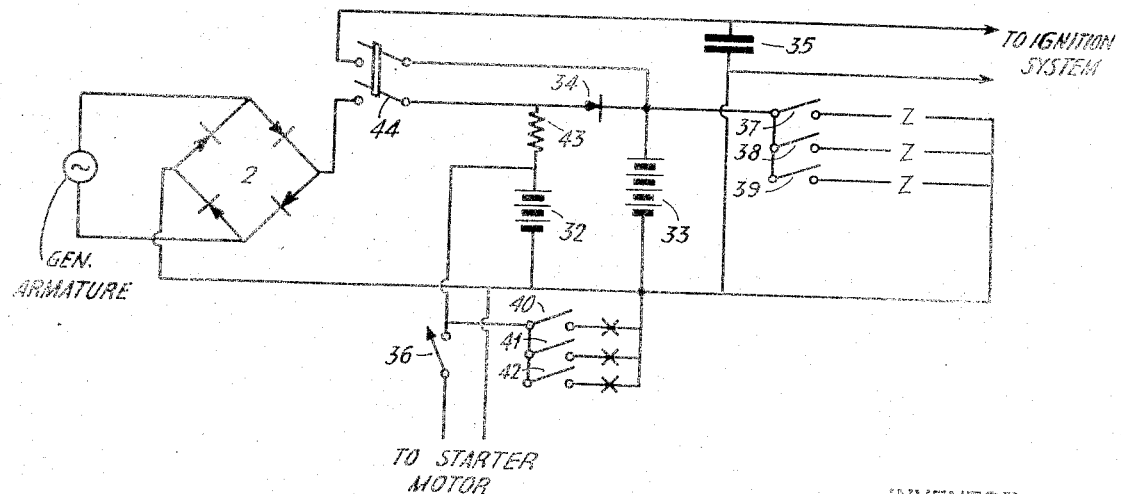

Nov. 29, 1938.   C. W. HANSELL   2,138,160
AUTOMATIC ELECTRICAL SYSTEM
Filed April 14, 1934   3 Sheets-Sheet 3
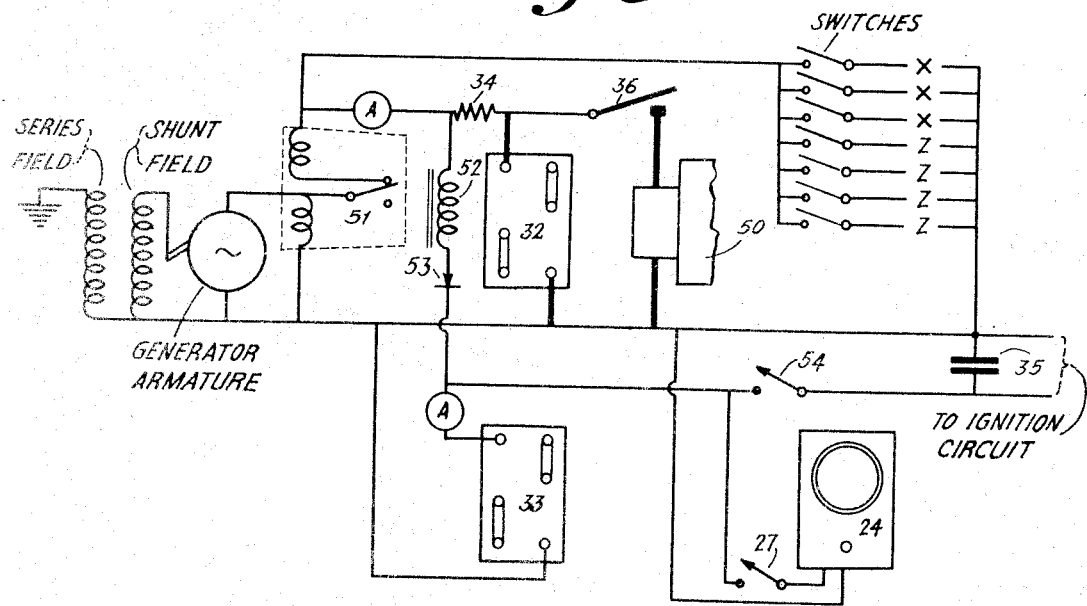
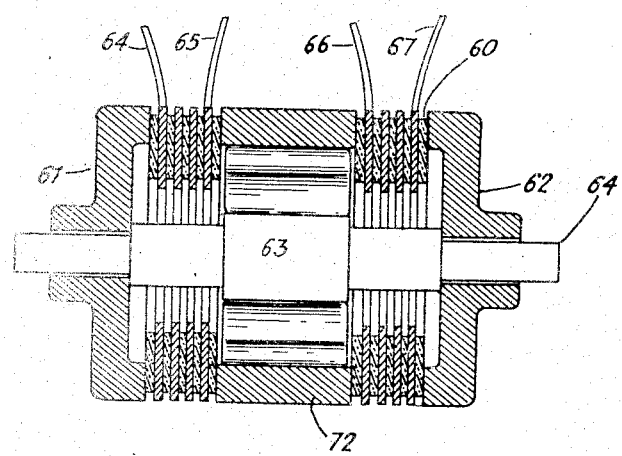
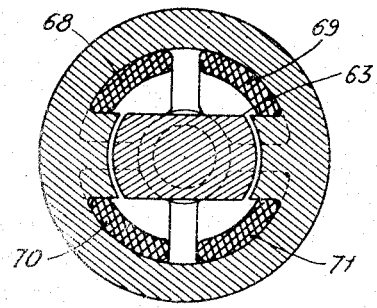
INVENTOR
C. W. HANSELL
BY
ATTORNEY Patented Nov. 29, 1938

2,138,160

UNITED STATES PATENT OFFICE 2,138,160

AUTOMOTIVE ELECTRICAL SYSTEM

Clarence W. Hansell, Rocky Point, N. Y., assignor to Radio Corporation of America, a corporation of Delaware Application April 14, 1934, Serial No. 720,559

3 Claims. (Cl. 171—313)

This invention relates to an improved automotive electrical system.

An object of this invention is to simplify and improve the present type of automotive electrical system which is utilized by practically all types of mobile units, and especially to improve automotive units having contained therein radio apparatus.

Another object of this invention is to improve the present type of automotive electrical system so that the ever increasing number of devices which are operated from the battery, such as the starter, ignition, lights, horns, cigar lighter, electrically operated gauges, radio receiver, fan for heater, cooling fan, bilge pump, and many other well-known devices, will not cause an unnecessary drain upon the battery, especially during the period of cold weather.

Still another object of this invention is to provide an improved electrical system which when combined with radio apparatus is relatively free from undesired noise and interruptions to radio operation due to large electrical load fluctuations such as may be caused by operation of the engine starter.

A further object of this invention is to provide improved starting of the engine by removing the effect of the starter load upon the voltage supplied to the engine ignition system.

A feature of this system is that it can be easily interchanged with the present electrical equipment as is used in automobiles, airplanes, motor boats, engine driven lighting plants and other like equipment.

Another feature of this invention is the ease of increasing or decreasing voltages for the different circuit elements by means of simple transformers.

The present day automotive electrical system includes generally a direct current generator and a storage battery. Such generators have contained within them a rotary armature having a commutator and associated brushes. Frequently trouble arises with the commutator and brushes due to wear, dust, grease and oil, causing poor contact between the commutater and the brushes, which gives rise to objectionable sparking. This commutator sparking causes an interference to radio reception and results in undesirable noises at the aural end of the radio apparatus. Such commutator and brush arrangements are expensive to manufacture, as is also its associated armature which comprises a considerable number of individual coils which are difficult and expensive to insulate properly, to insure long life to the generator. Likewise, the present direct current automotive generator is bulky, heavy, and generally inefficient.

By my invention I overcome and considerably reduce most of the objectionable features inherent in the present-day generators by substituting for the direct current generator a magneto type of alternating current generator which is preferably designed to give a square wave alternating current output which I connect to a balanced bridge arrangement or push-pull copper oxide rectifier or any other type of rectifier with similar characteristics, which will deliver direct current to the battery. Such a system will eliminate the sparking, wear and other troubles due to commutator and brushes in the direct current generators now in use.

The magneto type of alternating current generator can easily be designed to be more efficient and simpler in construction, and more compact than the present type of generators in use. This is partly due to the fact that a magneto type of alternating current generator can be driven at a higher speed than the direct current generators as employed in automotive units. The much higher speed in the magneto type of alternating current generator is entirely practical because the rotating element of the magneto could be constructed entirely of iron without individual windings which restrict the speed of the generators due to centrifugal force tending to loosen the windings from the armature. The armature designed entirely of iron, with suitable slots, could be utilized for speeds as high as 3600 revolutions per minute or more. The combination of a magneto type of alternating current generator and a balanced rectifier will automatically take care of regulating or holding down the charging current of the storage battery when such a type of generator is run at the highest speeds as mentioned above. If the reactance of the generator is a large factor in determining the alternating current output, then the change in frequency from the output with an increase in speed will automatically cause the reactance to vary in a direction tending to hold a constant charging current. However, if necessary, an external reactance could be used to assist in maintaining a reasonably constant current.

My invention will best be understood by referring to the accompanying drawings, in which, Fig. 1 is a schematic diagram of a magneto type of alternating current generator, a rectifier and a battery charging system.

Fig. 5 is a typical automotive circuit of this invention, employing an alternating current generator of the magneto type, a storage battery, and a rectifier for charging the storage battery, and included therewith a radio receiving set.

Fig. 6 is a schematic diagram of a modification of Fig. 2 wherein a transformer is employed for voltage regulation.

Fig. 7 is a schematic diagram of an improved arrangement to provide a more dependable source of direct current.

Fig. 8 is a diagram similar to the arrangement shown in Fig. 7 except for additional modifications.

Fig. 9 is a sectional view of an improved combined alternating current generator and rectifier.

Fig. 10 is a cross section of Fig. 9 showing the combined alternating current generator and rectifier.

Figure 1:
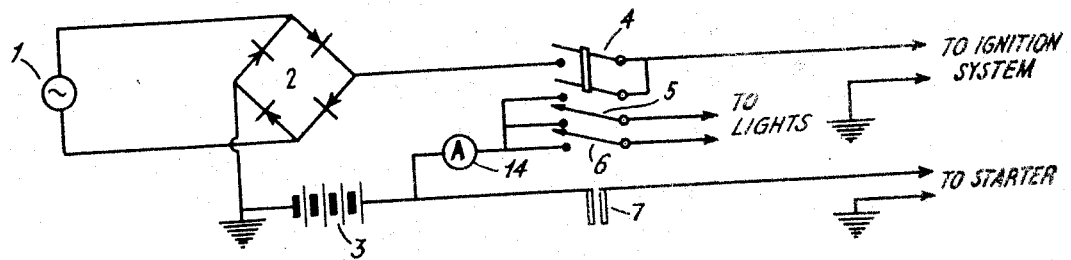

Referring now to Fig. 1 of the drawings, 1 designates the magneto type of alternating current generator, which may be of the type using self-excited or separately excited fields; furthermore, this alternating current generator may have a fixed permanent magnet or a rotating permanent magnet for the rotating element. Numeral 2 indicates the balanced copper oxide rectifier, 3 is a storage battery which is to be charged by the generator supplying alternating current which is rectified by the rectifier 2, 4 is a combined ignition and charging switch arranged to disconnect the rectifier charger from the battery when the ignition is disconnected. The copper oxide rectifiers have a small current leakage in the reverse direction; therefore it would be undesirable to leave the charger connected to the battery at all times. With the combined charging and ignition switch the battery will be automatically disconnected from the charger when the ignition is turned off. 5 and 6 indicate suitable switches for suitably controlling the lighting system. Other switches may be provided as needed and the circuits may be equipped with fuses, circuit breakers and indicators similar to the devices supplied for existing automotive and auto equipment. The starting motor is provided with a suitable switch, or the starting contacts of a starter relay, or a brush which is movable with respect to a fixed brush to make and break contact with the commutator of the starting motor for controlling the starting current. This is indicated at 7. An ammeter may be provided in the circuit as indicated at 14, for showing the normal charge and discharge of the battery.

Figure 2:
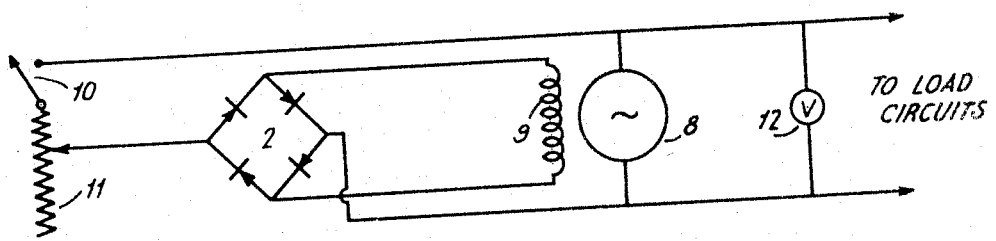
Fig. 2 is a schematic diagram of a self excited alternating current generator of the magneto type.

In Fig. 2 there is indicated a self-excited alternating current generator having an armature 8, a rotating generator field 9 which is connected across the opposite arms of the rectifier 2, and is provided with a generator field switch 10 and a rheostat 11, for the purpose of regulating the generator excitation, and so controlling the alternating current output voltage from the generator. The rectifier is preferably combined with the generator, as shown by Figs. 9 and 10 and will be described on one of the following pages. The rheostat 11 may if desired be substituted by any suitable variable reactor. A voltmeter 12 is connected across the load circuit to indicate the proper voltage. This combination is suitable for supplying alternating current power from an alternating current generator without a commutator or separate exciter for supplying the field current when manual adjustment of the voltage is sufficient.

Figure 3:
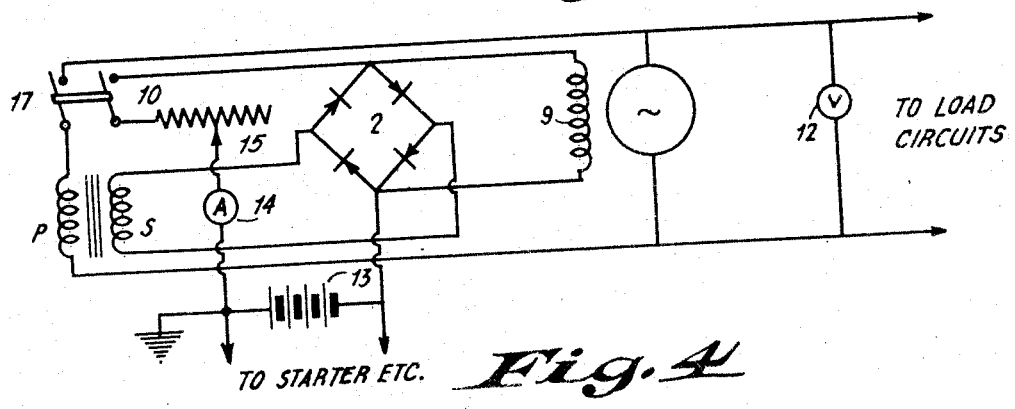
Fig. 3 is a schematic diagram of a self excited alternating current generator with an auxiliary battery.

Fig. 3 indicates a self-excited alternating current generator and is generally similar to that of Fig. 2 with the exception that the winding of the generator is for a higher voltage output, and there is provided an auxiliary battery 13 which is connected across the generator field and the opposite arms of the rectifier, having connected in series therewith an ammeter 14, a variable resistance or reactance 15, and a field switch 10. Across the armature of the alternating current generator there is connected the primary of a step-down transformer 16 which has connected in series therewith a control switch 17. The transformer 16 allows any ratio of alternating current output voltage to battery voltage. For example, the alternating current voltage may be about 115 volts and the battery voltage may be 6, 12 or 32 volts. The switches 10 and 17 are preferably controlled by a single handle.

Figure 4:
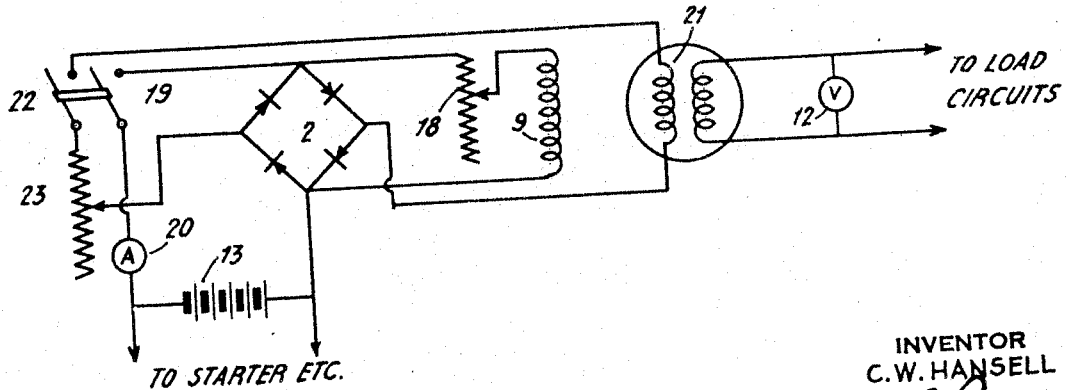
Fig. 4 is a schematic diagram of a self excited alternating current generator with an auxiliary battery, the self excited generator having an armature with two separate windings for delivering different voltages.

The diagram shown by Fig. 4 is generally similar to that of Figs. 2 and 3 except that the transformer is dispensed with and instead the generator is provided with two windings of different number of turns; one winding delivers the proper alternating current output voltage, and the second winding delivers the alternating current voltage for application to the rectifier which supplies the field excitation and battery charging current. The switches 19 and 22 are shown combined, as they are preferably controlled by a single handle.

The generator field 9 is connected across the rectifier bridge arrangement and has connected in series therewith a variable resistance 18 which regulates the generator field excitation. At the same points on the rectifier there is connected the storage battery 13 which has a series charging switch 19 and an ammeter 20. The junction points adjacent to those connected to the generator field are connected to the armature winding 21 which is connected in series with a switch 22 and a variable resistance 23 for regulating the charging rate of the storage battery.

Referring now to the diagram shown by Fig. 5, there is shown a similar circuit to that of Fig. 1 except that there is contained in addition a radio set 24 with its associated antenna 25 and ground connection 26, which is fastened to the engine, carrier or motor boat frame. The filament circuit (not shown) of the radio set 24, is energized by the storage battery 3 and is controlled by a switch 27. The high voltage for the radio set may be supplied by a step-up transformer 28 which is later rectified and filtered by a second rectifier and a filter 29. The high voltage supplied by the rectifier and filter 29 may also be used to energize the winding of the speaker field 30. An alternative arrrangement is to obtain the high voltage or anode supply for the receiver from a motor-generator unit, a dynamotor, a vibrator interrupter and rectifier, or any other of the devices now used to obtain high voltage direct current derived initially from a low voltage storage battery. In other words, the receiver may be one of the types now in common use, in which the entire power supply comes from the battery.

In the arrangement shown in Fig. 6, the self-excited alternating current generator and rectifier is similar to Fig. 2, except that the improved voltage regulation is accomplished by a transformer 31 having its primary or low current winding connected in series with the alternating current load and its secondary or high current winding in series with the supply to the rectifier for supplying the generator field. The transformer is so connected that an increase in alternating current load forces an increase in field current excitation and the transformer impedance and the turn ratio is so adjusted by a variable tap that the increase in field excitation just balances the tendency for the alternating curren load voltage to drop or, if desired, the alternating current output voltage may be made to rise or fall with change of load to any desired extent.

In Fig. 7 there is shown a novel arrangement particularly adaptable to use in motor driven vehicles such as automobiles, boats, railway cars propelled by internal combustion engines, airplanes, etc. This arrangement is an improvement upon the arrangements illustrated in Figs. 1 and 5 in that it provides much better starting for the engine, improved operation of radio equipment, greater battery storage capacity and other advantages.

In the circuit there is shown two batteries 32 and 33. One of them, 32 for example, is charged directly from the generator and rectifier and is used primarily to supply the starter motor of the engine with which it is associated. The second battery 33 is charged in parallel with the first one through a resistance 34 shown diagrammatically as a rectifier for reasons to be stated later. The presence of this resistance prevents heavy currents being drawn from the second battery while the engine starter is being operated. Therefore, the voltage of the second battery stays normal during starting even though the voltage of the first battery is pulled down far below normal by the current to the starting motor, which is controlled by a switch 36. The ignition system for the engine is supplied from the second battery and therefore full voltage for ignition purposes is available during the starting period and starting of the engine is much more reliable. Any other heavy loads which may pull down the battery voltage or produce strong load fluctuations and radio interference are also supplied by the first battery. Devices which may produce heavy loads momentarily or continuously include horns, cigar lighter, electrically driven fans, bilge pumps, control relays, automatic steering gear and the like, are connected at XXX and are provided with switches 40, 41 and 42. At the same time loads of relatively small value, and those subject to interruption or adverse effects from large voltage variations, such as the ignition system, radio receiver, reading lamps, etc., are operated from the second battery and connected at points ZZZ and provided with switches 37, 38 and 39. In order to facilitate charging, the resistance 34, through which the second battery is charged may be in the form of a rectifier as diagrammatically shown, such as the copper oxide type, which has relatively low resistance for charging currents but much higher resistance for reverse currents. The use of the rectifier as a resistance has a further advantage in that small voltage differences between the two batteries, such as might be caused by differences in electrolyte, cause only relatively little transfer of energy between the batteries. The rectifiers, even in the forward direction, have relatively high resistance for low potentials across them but this resistance in the forward direction decreases rapidly as the potential difference is increased by the action of the charging equipment. In many cases it may be found desirable to insert a small additional resistance 43 which may be in the form of a separate resistance unit, or in the form of resistance in the connecting leads, in series with the first battery for the purpose of controlling the division of charging current between the two batteries. There is also shown a uni-control switch 44 for controlling simultaneously the ignition and battery charging circuit.

In Fig. 8 the is shown schematically the double battery electrical system as shown in Fig. 7 in combination with the commutator type direct current generator 50' now commonly used for battery charging in motor cars, motor boats, etc. Because of the low back resistance through the generator the usual relay 51 or circuit breaker should, of course, be used to prevent discharge of the batteries through the generator when the generator speed is too low or when the engine is shut down.

In practice the two batteries may very well be mounted in a single container case. The case may also include the resistance 34 or rectifier in series with the charging circuit of the second battery. In this arrangement only three terminals need be brought out for external connections since one terminal may be made common to both batteries. Other parts of the circuit are starting motor 50, starting switch 36, reactance 52 and rectifier 53, radio set 24 and switches 27 and 54.

Of course the ignition system used with the engine should preferably be shielded and/or provided with resistances in series with the spark plugs to suppress radio interference. Also the power supply leads to the ignition system should preferably be filtered to reduce pulsations in load on the battery and transfer of radio frequency energy through the leads. In Figs. 7 and 8 there is shown a condenser 35 connected across the ignition supply leads for this purpose. Other circuit elements such as resistances, inductances, condensers, etc., may also be used in accordance with well known electrical filter principles.

In Figs. 9 and 10 there are shown a means to further simplify and improve the alternating current generator and rectifier charging equipment by combining the alternating current generator and its rectifier into a single unit. These figures show a magneto generator with a rotating permanent magnet for inducing alternating current voltages in stationary armature coils. Preferably the permanent magnet should be copper coated so that eddy currents in the copper will tend to prevent variations in flux of the magnet and so reduce armature reaction and voltage regulation of the generator. As shown by Figs. 9 and 10 the rectifier discs are mounted in the form of washers between the main frame and the end pieces of the generator. The drawing for the purpose of illustration, shows the rectifier discs 60 much thicker than they need to be in practice. The end pieces 61, 62 of the generator, serve to clamp the rectifier discs against the frame under pressure. Screws or bolts, not shown, may be used to exert the pressure. If desired, the rectifier discs may be mounted at only one end of the frame to facilitate taking the generator apart without disturbing the rectifier. An advantage of this arrangement, in addition to simplifying circuits and installation, is that the generator frame assists in conducting heat away from the rectifier. Other parts of the combined rectifier and generator are the permanent magnet rotor 63, shaft 74 and rectifier terminals 64, 65, 66 and 67, also four field coils 68, 69, 70 and 71 which are retained within the generator frame 72.

While I have shown only several modifications of this invention, it is to be understood that this application is not to be limited except for the limitations imposed in the appended claims.

I claim:

1. In combination, an alternating current generator, a balanced bridge connected copper oxide rectifier, said generator having two armature windings and a field winding, one of said armature windings supplying an alternating current load circuit, the other of said armature windings connected to said rectifier, a storage battery connected to said rectifier, said field winding connected to said storage battery, a resistance connected in series with said rectifier for controlling the charge rate of said storage battery, and a double pole switch, one pole of said switch connected in series with said battery and rectifier, and the other pole connected in a connection between said rectifier and the armature winding connected thereto.

2. An automotive starting and ignition system comprising a prime mover, an alternating current self-excited generator driven by said prime mover having a field winding and a pair of armature windings one of said armature windings supplying an alternating current load circuit, a balanced bridge connected copper oxide rectifier connected to the other of said armature windings, a storage battery connected to the output of said copper oxide rectifier, the field winding of said generator being connected to said storage battery, and means for varying the charging rate of said battery comprising an impedance in series with said armature winding and said rectifier.

3. An automotive starting and ignition system comprising a prime mover, an alternating current self-excited generator having a pair of armature windings and a field winding and driven by said prime mover one of said armature windings supplying an alternating current load circuit, a balanced bridge connected copper oxide rectifier connected to the other of said armature windings of said self-excited generator, a storage battery connected to said copper oxide rectifier the field winding of said generator being connected to said storage battery, and means for varying the charging rate of said battery comprising a resistance in series with said field winding and said rectifier.

CLARENCE W. HANSELL.